United States Patent
Ppallan et al.

(10) Patent No.: US 11,290,548 B2
(45) Date of Patent: Mar. 29, 2022

(54) METHOD AND SYSTEM FOR DISCOVERING EDGE-SERVER OR EDGE-SERVICE THROUGH DOMAIN NAME SERVER (DNS) RESOLUTION

(71) Applicant: Samsung Electronics Co., Ltd., Suwon-si (KR)

(72) Inventors: Jamsheed Manja Ppallan, Bengaluru (IN); Karthikeyan A, Bengaluru (IN); Madhan Raj Kanagarathinam, Bengaluru (IN); Dronamraju Siva Sabareesh, Bengaluru (IN); Ramanathan Palaniappan, Bengaluru (IN); Sweta Jaiswal, Bengaluru (IN); Irlanki Sandeep, Bengaluru (IN); Sunny, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/846,995

(22) Filed: Apr. 13, 2020

(65) Prior Publication Data

US 2020/0329109 A1 Oct. 15, 2020

(30) Foreign Application Priority Data

Apr. 12, 2019 (IN) .............................. 201941014880
Mar. 13, 2020 (IN) .............................. 201941014880

(51) Int. Cl.
*H04L 29/08* (2006.01)
*H04L 67/51* (2022.01)
(Continued)

(52) U.S. Cl.
CPC .......... *H04L 67/16* (2013.01); *H04L 61/1511* (2013.01); *H04L 67/28* (2013.01)

(58) Field of Classification Search
CPC ....... H04L 67/16; H04L 67/28; H04L 61/1511
See application file for complete search history.

(56) References Cited

U.S. PATENT DOCUMENTS 8,819,227 B1 * 8/2014 Keralapura ............. H04L 45/38
709/224
10,091,096 B1 * 10/2018 Howard .................. H04L 45/22
(Continued)

FOREIGN PATENT DOCUMENTS

KR 10-2013-0095249 A 8/2013

OTHER PUBLICATIONS

International Search Report dated Jul. 17, 2020, issued in International Patent Application No. PCT/KR2020/004997.

*Primary Examiner* — Jimmy H Tran
(74) *Attorney, Agent, or Firm* — Jefferson IP Law, LLP

(57) ABSTRACT

A method of discovering edge-servers and services through domain name server (DNS) resolution in a mobile edge computing (MEC) platform based network is provided. The method includes communicating a DNS-query from a user-equipment to a DNS server, wherein DNS query pertains to a user-request for accessing one or more web-based services. The user equipment (UE) receives, from the DNS server, a response comprising details with respect to a plurality of available-servers configured for rendering the web-based services. The details comprises at-least one of, an indication of the server being edge server associated with the MEC platform or a remote-server, a location of the server, and one or more services associated with the server. Each of the available servers are evaluated by the UE based on the response at-least based on the plurality of associated services and a distance of the server with respect to the UE. The UE selects the nearby edge-server and/or remote server out of the available servers for accessing the one or more
(Continued)

requested web-based services at-least based on the evaluation.

20 Claims, 10 Drawing Sheets

(51) Int. Cl.
*H04L 67/56* (2022.01)
*H04L 61/4511* (2022.01)

(56) References Cited

U.S. PATENT DOCUMENTS

| | | | |
|---|---|---|---|
| 2002/0010798 A1* | 1/2002 | Ben-Shaul | H04L 67/1021 709/247 |
| 2002/0087707 A1* | 7/2002 | Stewart | H04L 61/35 709/230 |
| 2012/0096106 A1* | 4/2012 | Blumofe | G06Q 50/00 709/213 |
| 2012/0096128 A1* | 4/2012 | Maloo | H04L 29/12066 709/219 |
| 2015/0127721 A1* | 5/2015 | Bergman | H04L 12/5691 709/203 |
| 2017/0317968 A1* | 11/2017 | Droms | H04L 61/1511 |
| 2018/0192471 A1* | 7/2018 | Li | H04W 4/50 |
| 2018/0263039 A1* | 9/2018 | Fang | H04W 72/0493 |
| 2019/0045409 A1* | 2/2019 | Rasanen | H04W 36/36 |
| 2019/0158300 A1* | 5/2019 | Sabella | H04M 15/61 |
| 2020/0106840 A1* | 4/2020 | Liu | H04L 67/16 |
| 2020/0112848 A1* | 4/2020 | Palaniappan | H04W 76/11 |
| 2020/0169609 A1* | 5/2020 | Wang | H04L 67/16 |
| 2020/0169610 A1* | 5/2020 | Wang | H04W 4/60 |
| 2020/0178198 A1* | 6/2020 | Ding | G07C 5/008 |
| 2020/0280822 A1* | 9/2020 | Stammers | H04L 67/1021 |
| 2020/0329008 A1* | 10/2020 | Dao | H04L 61/2007 |
| 2020/0396202 A1* | 12/2020 | Liu | H04L 67/16 |
| 2020/0396665 A1* | 12/2020 | Kanichu Veedu | H04W 36/0066 |
| 2021/0029075 A1* | 1/2021 | Yu | H04L 67/1002 |
| 2021/0083949 A1* | 3/2021 | Giust | H04L 41/5054 |

* cited by examiner

METHOD AND SYSTEM FOR DISCOVERING EDGE-SERVER OR EDGE-SERVICE THROUGH DOMAIN NAME SERVER (DNS) RESOLUTION

CROSS-REFERENCE TO RELATED APPLICATION(S)

This application is based on and claims priority under 35 U.S.C. § 119(a) of an Indian Provisional Patent application number 201941014880, filed on Apr. 12, 2019, in the Indian Patent Office and of an Indian Non-Provisional Patent application number 201941014880, filed on Mar. 13, 2020, in the Indian Patent Office, the disclosures of each of which are incorporated by reference herein in their entireties.

BACKGROUND

Field

The disclosure relates to telecommunication-systems and in-particular to domain name server (DNS) resolution systems.

Description of the Related Art

Mobile edge computing (MEC) extends cloud computing and services to the edge of a network, for example, using computing-nodes deployed inside access-networks, mobile devices, or IoT end devices such as sensors and actuators. MEC has the potential to provide data, computing, storage, and application services at the network edge using methods similar to cloud computing in remote data centers. The field of edge computing may include developments toward mobile network applications (i.e., mobile edge computing) and IoT-focused applications (i.e., fog computing).

SUMMARY

This summary is provided to introduce a selection of concepts in a simplified format that are further described in the detailed description of the disclosure. This summary is not intended to identify key or essential inventive concepts of the claimed subject matter, nor is it intended for determining the scope of the claimed subject matter.

Aspects of the disclosure are to address at least the above-mentioned problems and/or disadvantages and to provide at least the advantages described below. Accordingly, an aspect of the disclosure is to provide a method of discovering edge-server or edge-service through domain name server (DNS) resolution in a mobile edge computing (MEC) platform based network. The method comprises communicating a DNS-query from a user-equipment to a DNS server, wherein DNS query pertains to a user-request for accessing one or more web-based services. The UE receives, from the DNS server, a response comprising details with respect to a plurality of available-servers configured for rendering the web-based services. The details comprises at-least one of, an indication of the server being edge server associated with the MEC platform or a remote-server, a location of the server (e.g. current geographical location in case of a mobile-server or a pre-defined location in case of a stationary-server), and one or more services associated with the server. Each of the available servers are evaluated by the UE based on the response at-least based on the plurality of associated services and a distance of the server with respect to the UE. Thereafter, the UE selects the nearby edge-server and/or remote server out of the available servers for accessing the one or more requested web-based services at-least based on the evaluation.

Additional aspects will be set forth in part in the description which follows and, in part, will be apparent from the description, or may be learned by practice of the presented embodiments.

In accordance with an aspect of the disclosure, a user-equipment discovering edge-server or edge-service through DNS resolution in a mobile edge computing (MEC) platform based network is provided. The UE includes a transmitter for communicating a DNS-query to a DNS server, such that the DNS query pertains to a user-request for accessing one or more web-based services. Further, the UE comprises a receiver for receiving, from the DNS server, a response comprising details with respect to a plurality of available-servers configured for rendering the web-based applications. The details comprises at-least one of an indication of the server being edge server associated with the MEC platform or remote sever, a location of the server, and one or more services associated with the server. The UE comprises a processor for evaluating each of the available servers at-least based on the plurality of associated services a distance of the server with respect to the UE. Further, the UE is configured for selecting a nearby edge-server and/or remote server out of the available servers for accessing the one or more requested web-based services at-least based on the evaluation.

In an implementation, the DNS server maintains a resource record (RR) with respect to a plurality of servers. The RR identifies each of the plurality of servers through one or more of server name, a flag indicating the type of server, a port number, a location, an IP address, an IP version, a priority level, type of services rendered, and type of content rendered.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will become more apparent from the following description taken in conjunction with the accompanying drawings in which.

Figure 1:
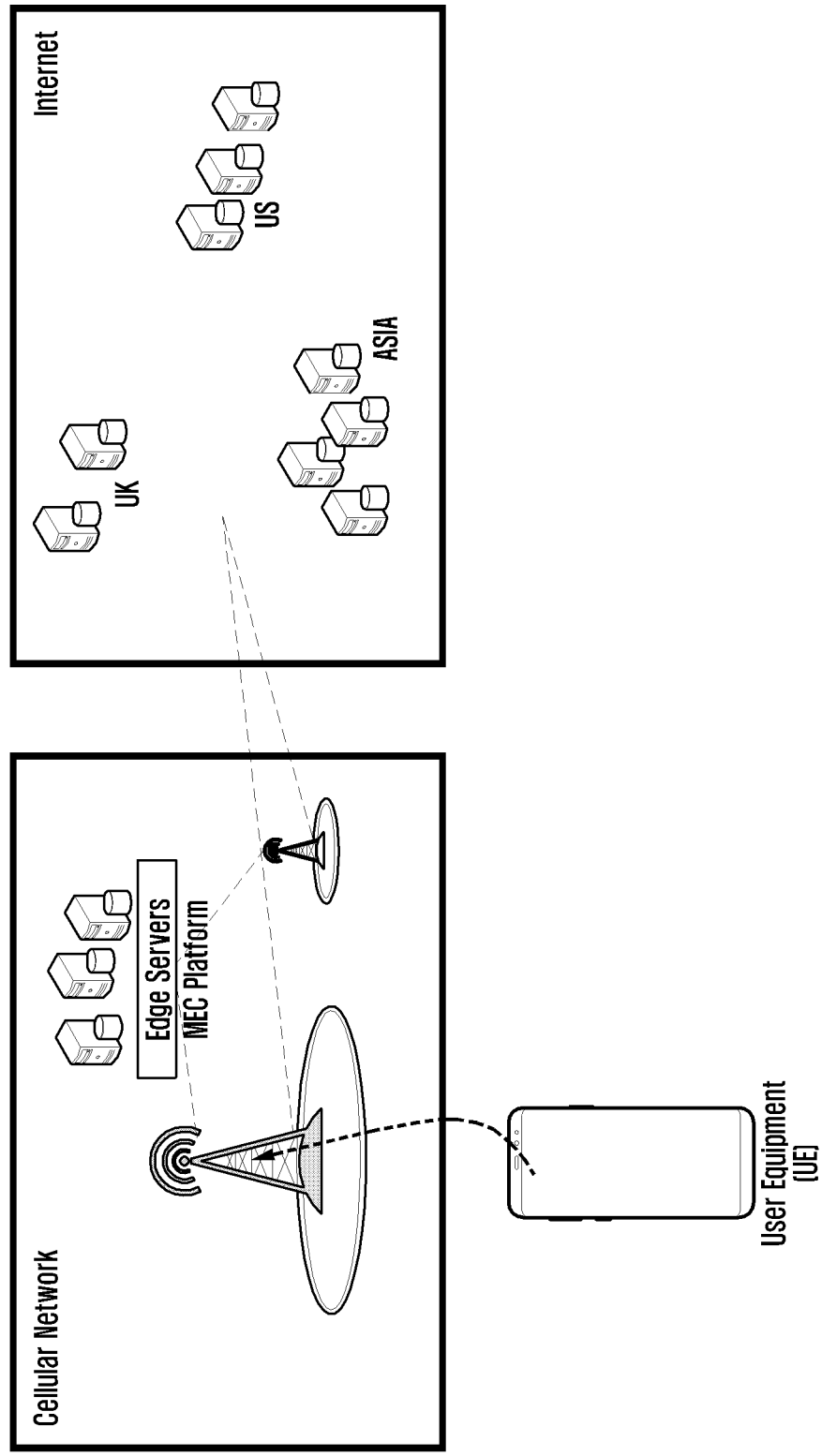
FIG. 1 illustrates a state-of-the art communication network according to an embodiment of the disclosure.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the disclosure. Furthermore, in terms of the construction of the device, one or more components of the device may have been represented in the drawings by symbols, and the drawings may show only those specific details that are pertinent to understanding the embodiments of the disclosure so as not to obscure the drawings with details that will be readily apparent to those of ordinary skill in the art having benefit of the description herein.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the disclosure will be described below in detail with reference to the accompanying drawings.

Mobile edge computing (MEC) enabled applications in mobile and wireless-devices require usage of an MEC-platform (e.g. life cycle management (LCM) proxy) to find the edge-servers.

FIG. 1 illustrates a state-of-the art communication network according to the related art.

Referring to FIG. 1, an example telecommunication-system incorporating the MEC architecture is depicted, wherein MEC-Enabled Apps get the list of MEC-servers using MEC-Platform. However, there is no provision to identify the presence of edge-servers using a DNS-Lookup. Accordingly, UE cannot itself determine the lowest latency MEC or Cloud Server and has to rely on RTT-protocol.

Figure 2:
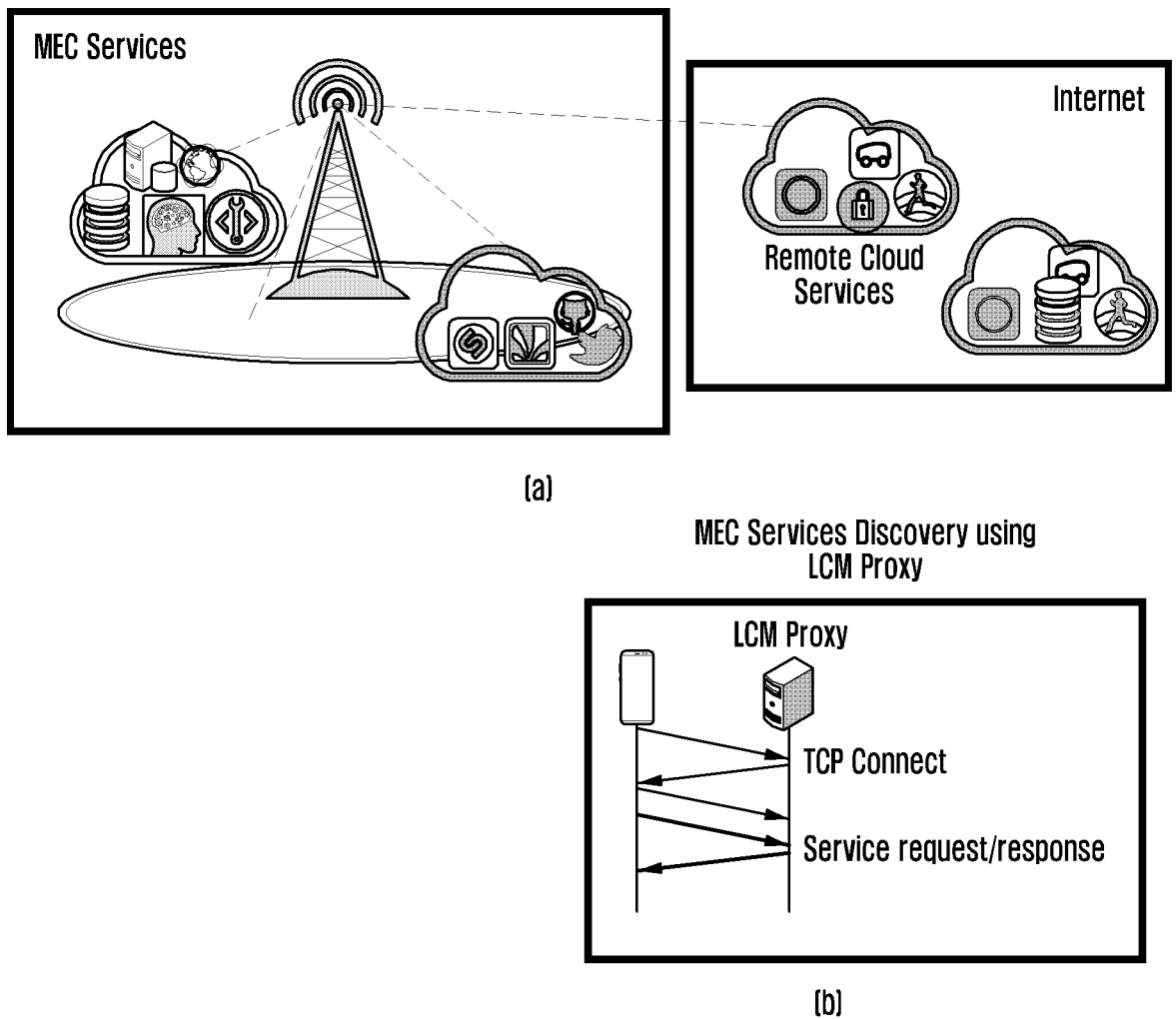
FIGS. 2A and 2B illustrates communication network according to various embodiments of the disclosure.

FIGS. 2A and 2B illustrate another state-of-the art communication network according to the related art.

Referring to FIG. 2A, the MEC Platform provides some/all of the services provided by the remote-servers of a domain. Accordingly, the user equipment (UE) has to identify the services by using MEC-layer. The above case is an example of MEC Service Discovery.

Referring to FIG. 2B in continuation to FIG. 2A, MEC architecture has a dedicated server named LCM Proxy for service discovery. This causes extra overhead for UE since UE has to request an LCM Proxy-server for service-information. Quoting an example, if a UE wishes to connect with gaming-service, it has to find the MEC or cloud server through DNS server route upon having been turned down by the edge server. This has been further referred in FIG. 3

Figure 3:
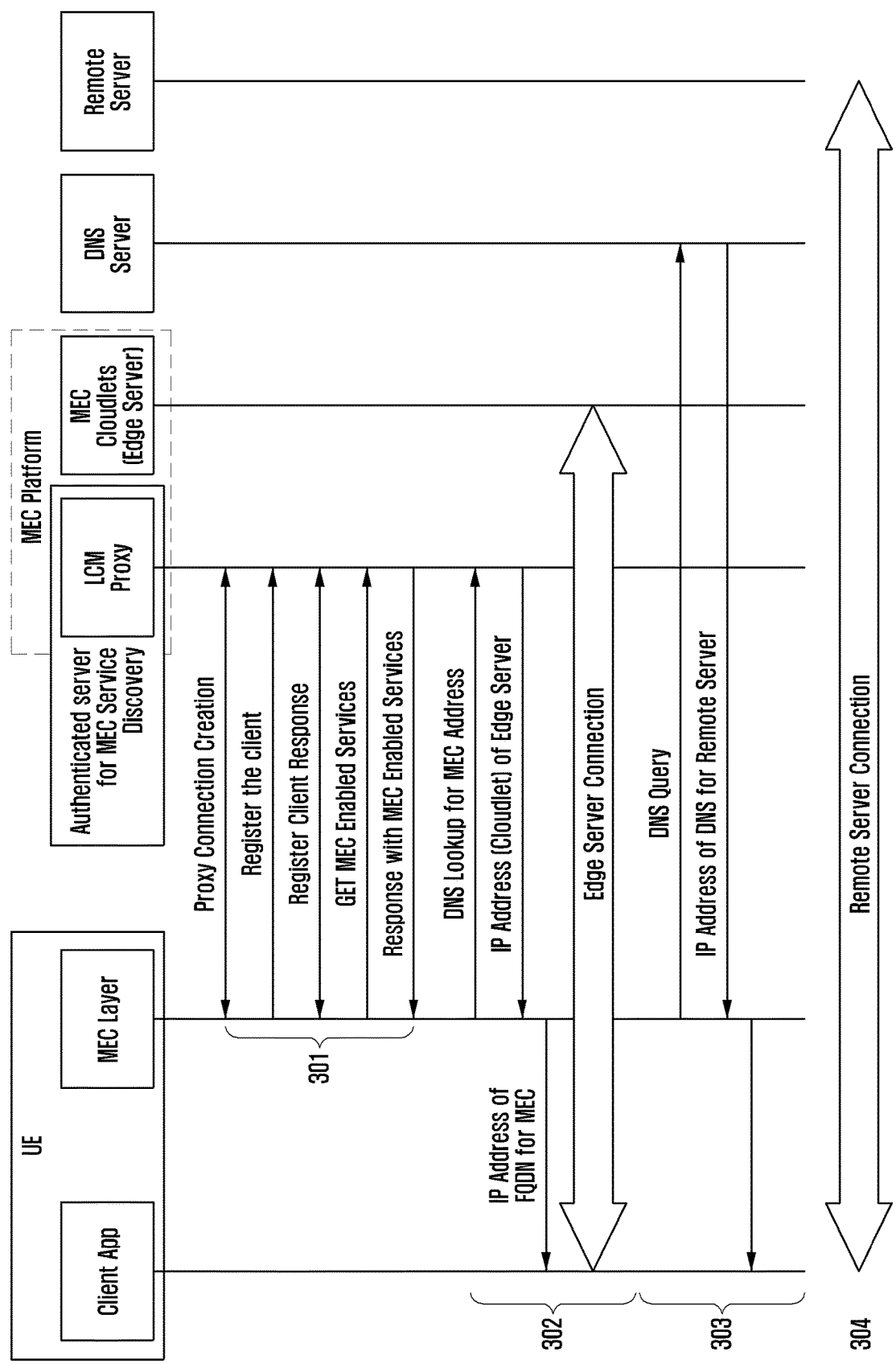
FIG. 3 illustrates a communication-flow in a communication network according to the an embodiment of the disclosure.

FIG. 3 illustrates a state-of-the art communication-flow in a communication network according to an embodiment of the disclosure.

Referring to FIG. 3, operation 301 represent UE exploring available MEC services through connecting with LCM proxy, which is an Authenticated server for MEC Service Discovery. At operation 302, the UE connects with an Edge server (i.e., a base station, an eNB, or a gNB) if the MEC services requested by the UE are available at the edge server. Else, at operation 303, the UE resorts to a DNS look-up for exploring the requested services. At operation 304, the UE is connected to the remote cloud server based on the address provided by the DNS server. The UE is connected to the remote cloud-server hosting the desired service based on the address provided by the DNS server. Accordingly, the UE has to compulsorily undergo at-least the operations 301 and 302 before it connects the right server.

Overall, the state of the art UEs or state of the art MEC-enabled apps in the UE are not aware of the lowest-latency MEC/Cloud server. Moreover, service discovery in UE using MEC Layer does not meet the strict delay requirements of MEC. Last but not the least, as per the state of the art, neither UE has any provision to browse network for services nor servers refer their services.

The above information is presented as background information only to assist with an understanding of the disclosure. No determination has been made, and no assertion is made, as to whether any of the above might be applicable as prior art with regard to the disclosure.

Figure 4:
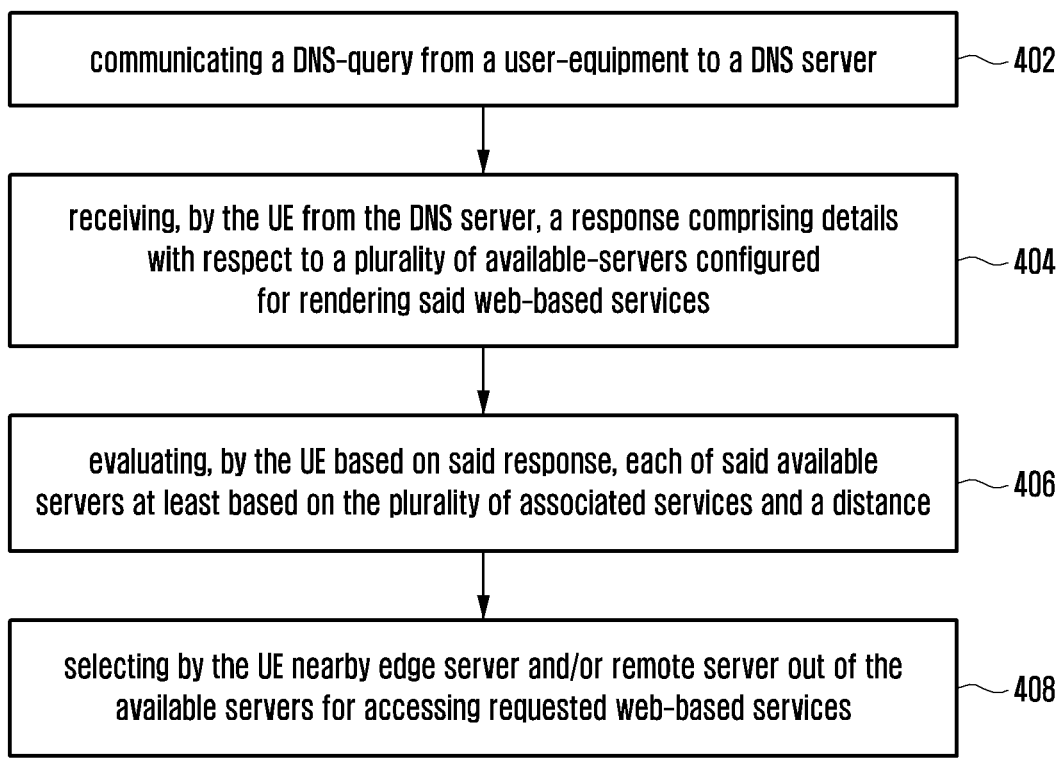
FIG. 4 illustrates method operations, according to an embodiment of the disclosure.

FIG. 4 illustrates method operations, according to an embodiment of the disclosure.

Referring to FIG. 4, the disclosure illustrates a method of discovering edge-server and edge-service through domain name server (DNS) resolution in a mobile edge computing (MEC) platform based network.

The method comprises communicating (operation 402) a DNS-query from a user-equipment to a DNS server. an application may include at least one web-based service. When the application is executed in the UE or the application is provided through the UE, the UE needs address information of a server corresponding to at least one web-based service for the application. Thus, DNS-query is related to user requests to access at least one web-based service.

According to an embodiment of the present invention, a DNS-query may include a representative domain name for the application. That is, the DNS-query may include one main domain name in place of at least one domain name corresponding to at least one web-based service. For example, one or more domain names corresponding to one or more web-based services may be img.xyz.com, chat.xyz.com. In this case, the representative domain name for the application or the one or more domain names may be xyz.com.

The DNS-query pertains to a user-request for accessing one or more web-based services. The communication of the DNS query from UE comprises identifying an application within the DNS query and a parameter related to:

a. accessing content or information; and b. discovering standard services defined by one or more of hypertext transfer protocol (HTTP), quick UDP internet connections (QUIC), file transfer protocol (FTP);

c. discovering non-standard services pertaining to one or more of advertisements, medical, or gaming services.

The method further comprises receiving (operation 404), by the UE from the DNS server, a response comprising details with respect to a plurality of available-servers configured for rendering the web-based services. The details comprise at-least one of: an indication of the server being edge server associated with the MEC platform or a remote-server, a location of the server (current-geographical location in case of a mobile-server or a pre-defined location in case of a stationary-server, For example, location can be expressed in latitude and longitude.), or one or more services associated with the server. The response from the DNS server comprises receiving, with respect to each of the plurality of edge and/or remote servers, a parameter as at-least one of: a current-load, the type of services rendered, a target server name, a port information, a protocol supported by the server, and an IP address.

In an implementation, the DNS server maintains a resource-record (RR) or a data structure with respect to a plurality of servers. The RR identifies each of the plurality of servers one or more of:

server name;

a flag indicating the type of server;

a port number;

a location;

an IP address;

an IP version;

a priority level;

type of services rendered; and type of content rendered

In case the UE is operating as a smartphone having an operating-system supporting MEC application then as a part of precursor operations, the method comprises receiving MEC enabled applications from the MEC platform during registering of the device with a mobile network operator. During the launching of the MEC enabled applications, the smartphone based UE communicates the DNS query.

The method further comprises evaluating (operation 406) by the UE based on the response, each of the available servers at least based on the plurality of associated services and a distance of the server with respect to the UE. In an implementation, the evaluation comprises determining distance between:

a) the UE and each of the edge server; and b) the UE and each of the remote server.

Such evaluation of the server by the UE for availing the service comprises identifying the list of services associated with the edge server of MEC platform or remote server, classifying the plurality of servers configured to render the service based on a priority and weightage associated with servers as received within the response; and determining one or more nearest server out of the edge-servers and the remote servers for the requested web-based service based on the distance with respect to the UE and the classification to thereby enable the selection of a low-latency server as a part of selection of the nearby server.

Further, the method comprises selecting (operation 408) by the UE nearby edge server and/or a remote server out of the available servers for accessing the one or more requested web-based services at-least based on the evaluation with low-latency. Likewise, the nearest server for executing the MEC enabled application is located for minimizing latency.

In an implementation, the UE may include a processor, a transceiver, a transmit/receive element, a speaker/microphone, a keypad, a display/touchpad, non-removable memory, removable memory, a power source, a global positioning system (GPS) chipset, and other peripherals. The processor may be a general purpose processor, a special purpose processor, a processor, a digital signal processor (DSP), a plurality of microprocessors, one or more microprocessors in association with a DSP core, a controller, a microcontroller, etc.

The transmit/receive element may be configured to transmit signals to, or receive signals from, a base station (e.g., the base station) over the air interface. For example, in one embodiment, the transmit/receive element may be an antenna configured to transmit and/or receive RF signals. The transmit/receive element may include any number of transmit/receive elements. More specifically, the wireless transmit/receive unit (WTRU) may employ multiple-input multiple-output (MIMO) technology. Thus, in one embodiment, the WTRU may include two or more transmit/receive elements (e.g., multiple antennas) for transmitting and receiving wireless signals over the air interface.

The transceiver may be configured to modulate the signals that are to be transmitted by the transmit/receive element and to demodulate the signals that are received by the transmit/receive element. The processor may also be coupled to the GPS chipset, which may be configured to provide location information (e.g., longitude and latitude) regarding the current location of the WTRU. In addition to, or in lieu of, the information from the GPS chipset, the WTRU may receive location information over the air interface from a base station (e.g., base stations) and/or determine its location based on the timing of the signals being received from two or more nearby base stations. As may be understood, the server-location may be a current geographical location in case of a mobile-server or a pre-defined location in case of a stationary-server.

Figure 5:
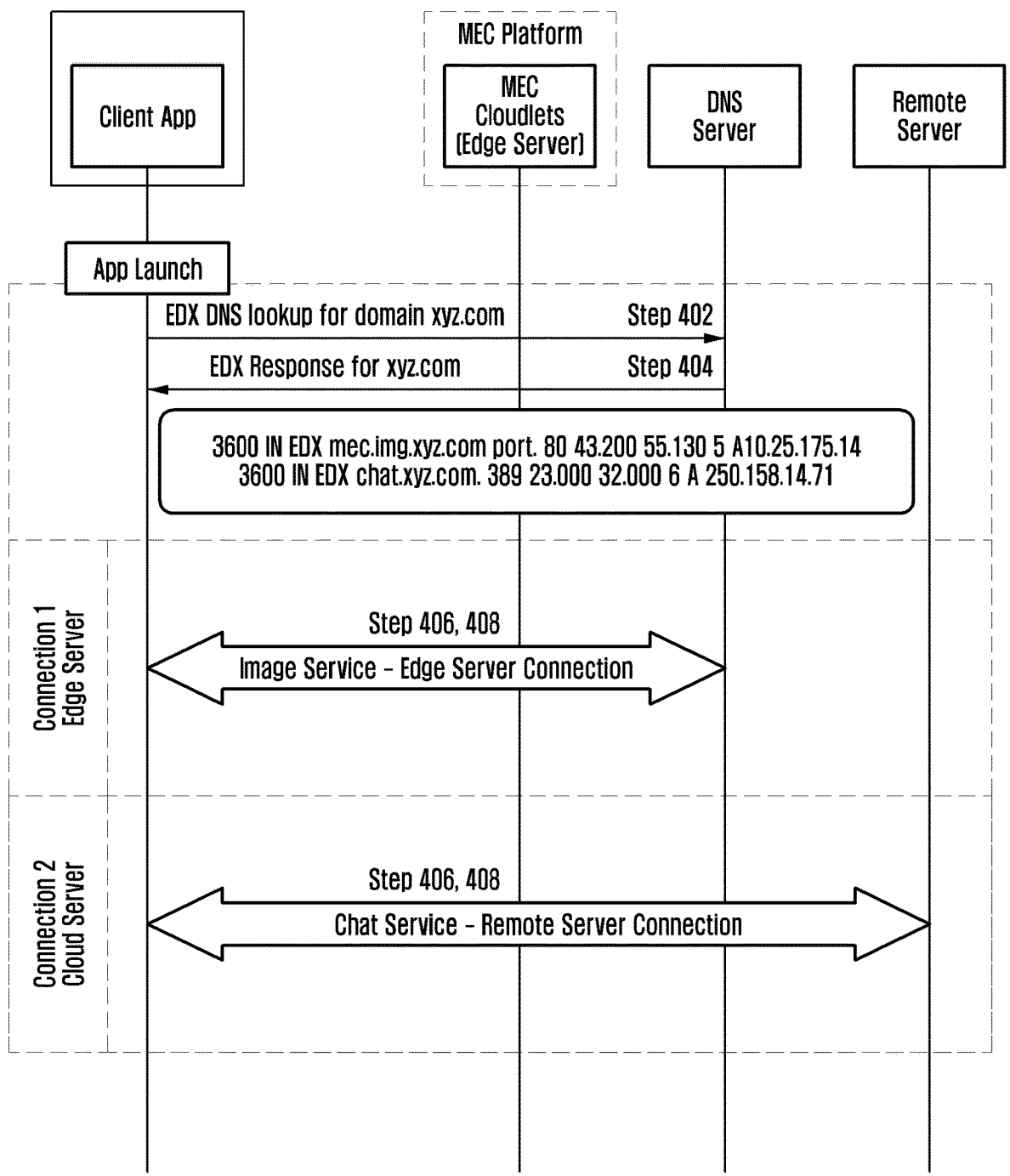
FIG. 5 illustrates an example networking-environment, according to an embodiment of the disclosure.

FIG. 5 illustrates an example networking-environment, according to an embodiment of the disclosure.

Referring to FIG. 5, the UE, DNS server, MEC platform based edge server and the remote server interact through the operations 402 to 408 as depicted in the previous FIG. 4.

In an implementation, the DNS server is incorporated with a resource records or a data structure mobile edge computing-DNS ("MEC-D") for allowing the UE to performing service discovery. The resource record is employed for identifying the server name, finding the port number to be used, finding the applicable location of the server, resolving the server name to IP address in a single DNS query. MEC-D enabled devices send "Type EDX DNS query" to identify the lowest latency server that supports a specific service. MEC-D enabled DNS Servers respond to the EDge eXchanger (EDX) DNS Query by providing the list of servers supporting the requested service along with the target server name, priority, port, location and its IP address.

In an implementation the DNS request corresponding to operation 402 for a domain is defined by "EDX DNS lookup for main domain xyz.com"

As a part of response, the DNS response in operation 404 advertises at least of service associated with the main domain "xyz.com" as available through the edger server and remote server. In an example, the operation 404 may be defined by the format:

3600 IN EDX mec.img.xyz.com port. 80 43.200 55.130 5 A10.25.175.14

3600 IN EDX chat.xyz.com. 389 23.000 32.000 6 A 250.158.14.71

Based thereupon through operation 408, the UE access the "image services" by connecting to edge server defined by address "80 43.200 55.130 5 A10.25.175.14." The UE accesses the "chat services" by connecting to remote server defined by address "389 23.000 32.000 6 A 250.158.14.71".

Further, the DNS response may include information on at least one server or a plurality of servers for each service type. For example, information of a plurality of servers is included for the image service, and information of one server for the chat service may be included.

In selecting these two types of servers, processes for selecting a low latency server are necessary.

For this purpose, UE location identification can be derived by the following process.

The MEC-D of the DNS server can select a low latency server based on the location information of the UE and the location information of the servers.A) Using global positioning system (GPS): If UE Location Service is ON, MEC-D in DNS server uses the GPS service to identify UE's Location B) Using Cell identification (ID)/wireless fidelity (Wi-Fi): If UE Location Service is not available, MEC-D in DNS SERVER utilizes the Cell ID and/or Wi-Fi to identify UE's Locations The UE itself is configured to discovering the nearest server by one or more:

A) EDGE Flag in EDX RR: EDX RR contains a flag to denote remote and edge servers. MEC-D utilize it to discover edge servers B) Server Location from EDX RR: Nearest server will be calculated based on the Geographical distance i.e., Latitude and Longitude information of server received in the DNS Response.

At least due to aforesaid, the resource record MEC-D (MEC DNS) in the DNS server enhances the user experience by enabling UE to identify lowest latency MEC server and perform service discovery. As may be understood, the MEC-D provides a new DNS Resource Record (RR) type named EDX (EDge eXchanger) Record to achieve it. EDX RR enables UE to explore the network for all available services, and to discover the edge servers for low latency using the location information. In addition, EDX RR enables servers to advertise service types and to provide information required access it.

The data structure of the RR may be tabulated as follows:

| | |
|---|---|
| Owner | The domain-name for which these RR refers to. |
| TTL | Standard DNS meaning [RFC 1035]. |
| Class | Standard DNS meaning [RFC 1035]. EDX records occur in the IN Class. |
| Edge :. | A flag to set the target host as edge or remote server |
| Service : | The symbolic name of the services supported by the owner. |
| Proto | The symbolic name of the protocol supported by target host, with an underscore (_) prepend to prevent collisions with DNS labels that occur in nature |
| Target-host :... | The domain name of the target host |
| Port : | The port on this target host of this service. |
| Lat | The latitude of the location of the Target-host. |
| Long : | The latitude of the location of the Target-host. |
| Priority | The priority of this Target-host. |
| Version | The Internet Protocol (IP) Version defines the type of target host IP address |
| .Address : | A 128 bit Internet address. |

According to an embodiment, the MEC-D (or DNS server) may determine whether the edge server for the UE is based on the location information of the UE and the location information of the server. According to the determination, the MEC-D (or DNS server) may transmit information indicating whether an edge server is present to the UE through an edge flag in the data structure of the EDX RR. Further, according to an embodiment, the DNS response may include information of a plurality of servers.

At this time, the UE can calculate the distance based on the location information of the UE and the location information of the server, using the location information of the server (for example, latitude and longitude in the table), and select a nearby server by predicting latency. In addition, according to an embodiment, the priority of the table may be for MEC-D (or DNS server) to indicate the proximity of the corresponding server based on the location information of the UE and the location information of the server.

Alternatively, the priority may be information about a relative latency (or proximity) between the corresponding terminal and the servers when the DNS response includes information of a plurality of servers. In addition, the priority may be information in which the latency is considered along with QoS, policies, and the like for servicing the terminal.

Figure 6:
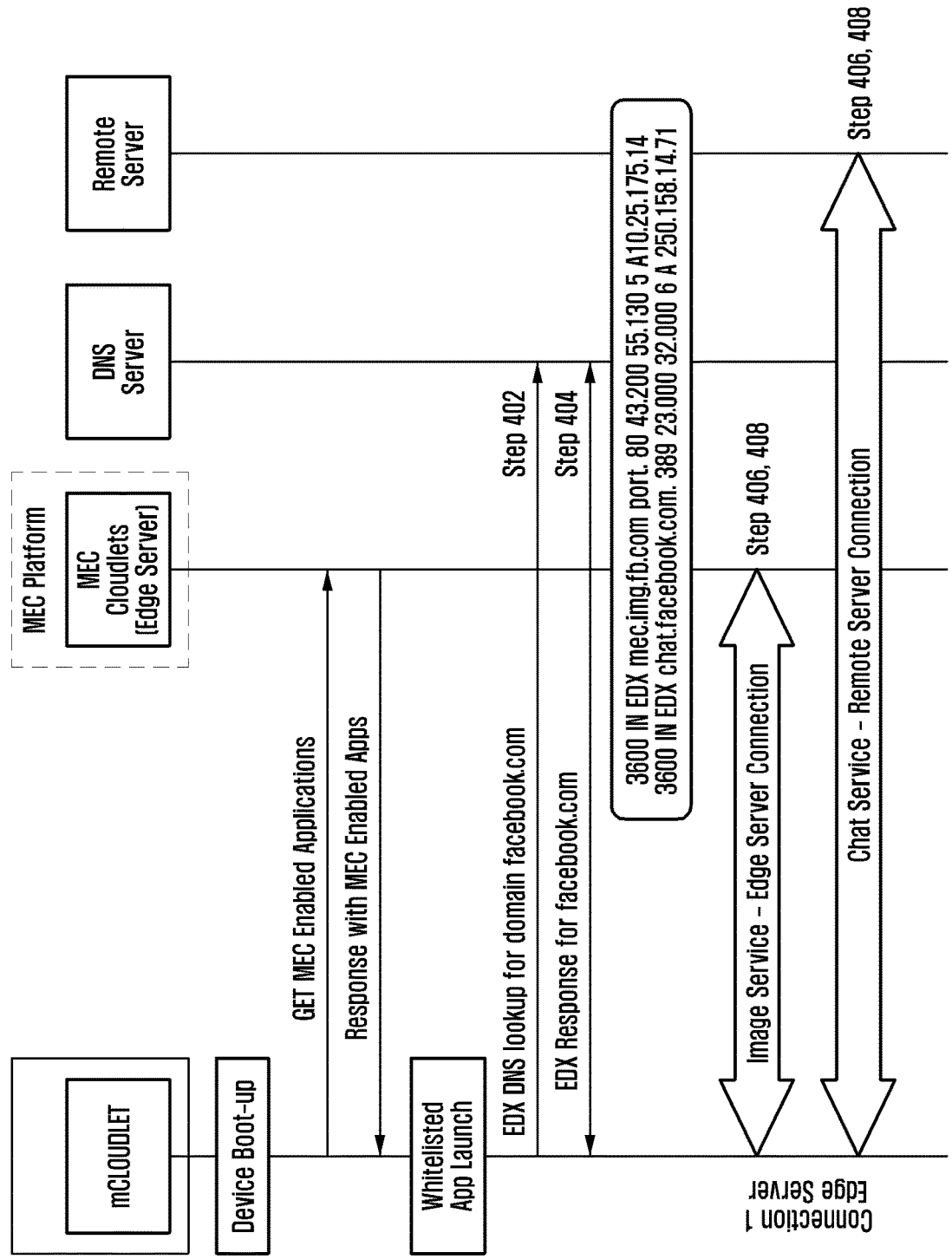
FIG. 6 illustrates another example networking-environment, according to an embodiment of the disclosure.

FIG. 6 illustrates another example networking-environment, according to an embodiment of the disclosure.

Referring to FIG. 6, the UE which is smartphone, DNS server, MEC platform based edge server and the remote server interact through the operations 402 to 408 as depicted in the previous FIG. 4. The precursor operations or factory-setting configuration based operations comprise receiving MEC enabled applications from the MEC platform during registering of the device with a mobile network operator. During the launching of the MEC enabled applications, the smartphone based UE communicates the DNS query.

Figure 7:
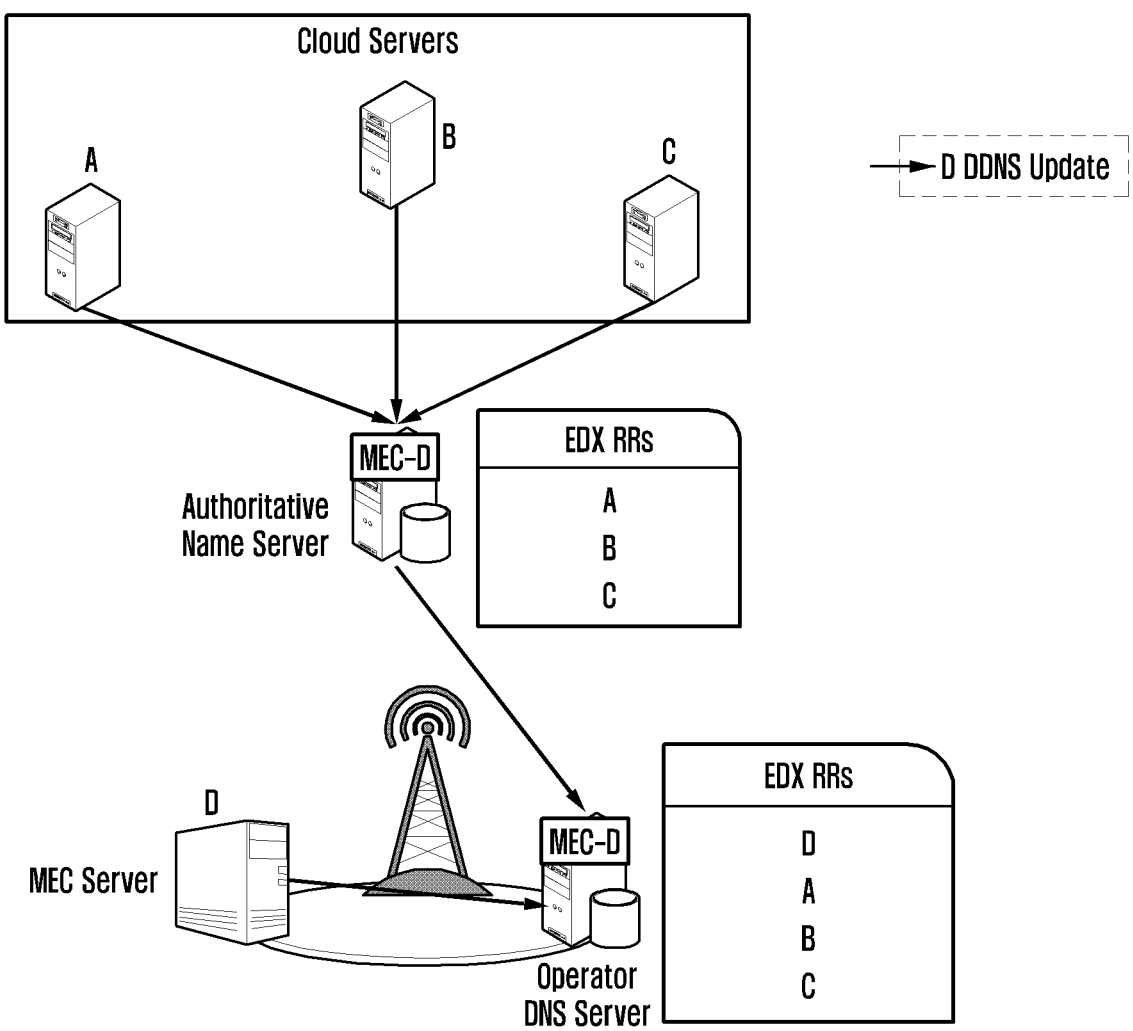
FIG. 7 illustrates another example implementation of method operations of FIG. 4, according to an embodiment of the disclosure.

FIG. 7 illustrates another example implementation of method operations of FIG. 4, according to an embodiment of the disclosure.

Referring to FIG. 7, it depicts precursor operations or ancillary operations to the method operations of FIG. 4 by depicting a DNS Server Configuration for EDX RR. As shown in the figure, the DNS server of the mobile network operator maintains the resource record RR or MEC-D which is regularly updated with the addresses of MEC server (D as shown in FIG. 7) and remote cloud servers (A, B, C as shown in FIG. 7). For such purpose, the network operator DNS server interacts with an authoritative name server, which also maintains RR or MEC-D with respect to the cloud servers.

Figure 8:
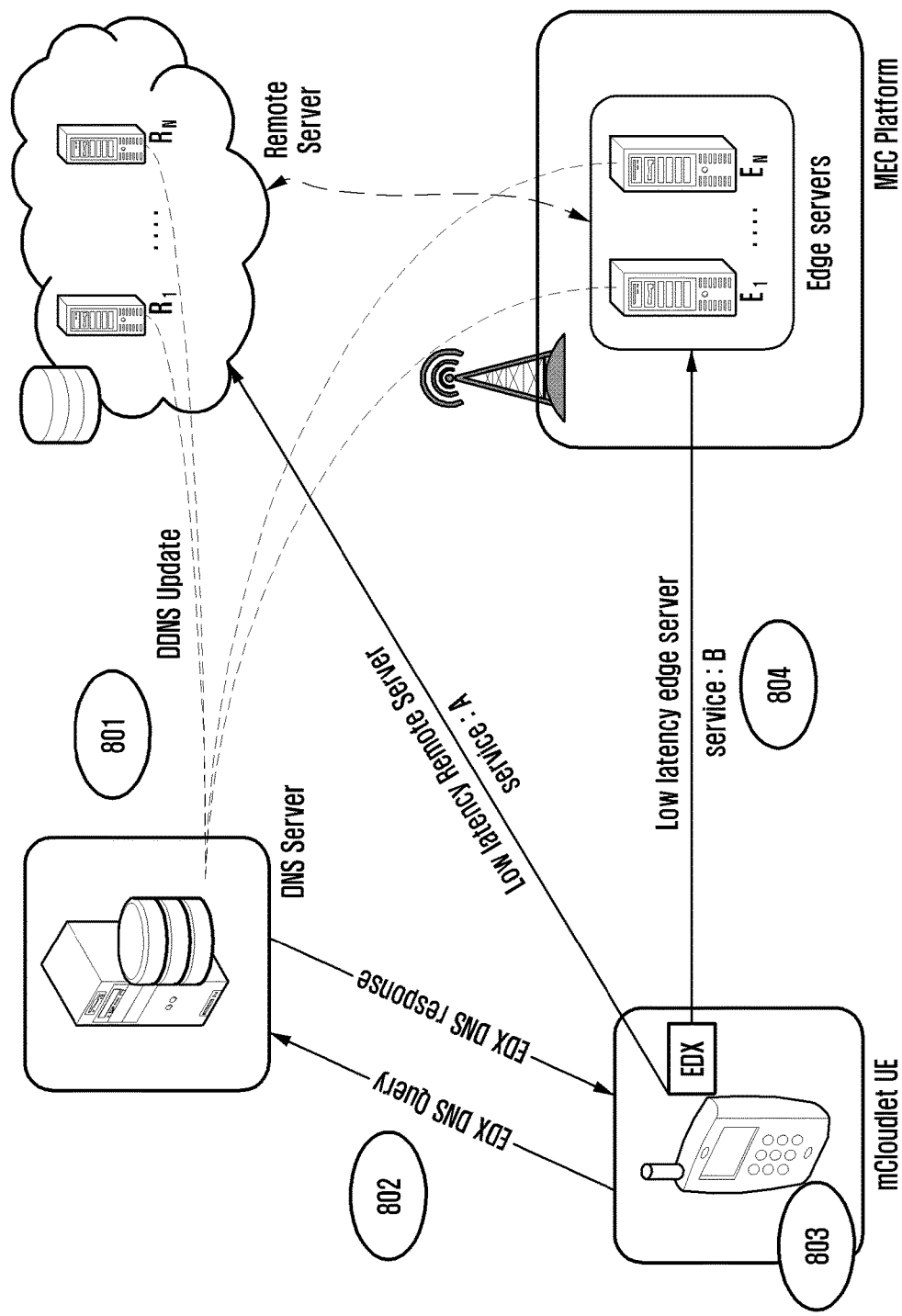
FIG. 8 illustrates an example implementation of method-operations of FIG. 4, according to an embodiment of the disclosure.

FIG. 8 illustrates an example implementation of method-operations of FIG. 4, according to an embodiment of the disclosure.

Referring to FIG. 8, an overall operation of mCloudlet as a part of MEC.

Operation 801 refers to the DDNS updated as referred in FIG. 7. An mCloudlet infrastructure allows the service provider to update their server location and service details in operator DNS server by DDNS update.

Operation 802 corresponds to the operations 402 and 404. When a whitelisted application tries to connect with the server, mCloudlet client on the device sends EDX query to the operator DNS server and gather the details of all available server's location and running services.

Operation 803 corresponds to operation 406. The mCloudlet client on the device computes the distance between UE and server based on its location and finds the nearest server. For service discovery, mCloudlet on the device identifies and classifies the services based on the priority and weightage received from the EDX response.

Operation 804 corresponds to operation 408. Based on calculation in operation 803, mCloudlet finds the nearest edge server and explorers running services on the edge servers FIG. 9 illustrates another example implementation of method operations of FIG. 4, according to an embodiment of the disclosure.

Figure 9:
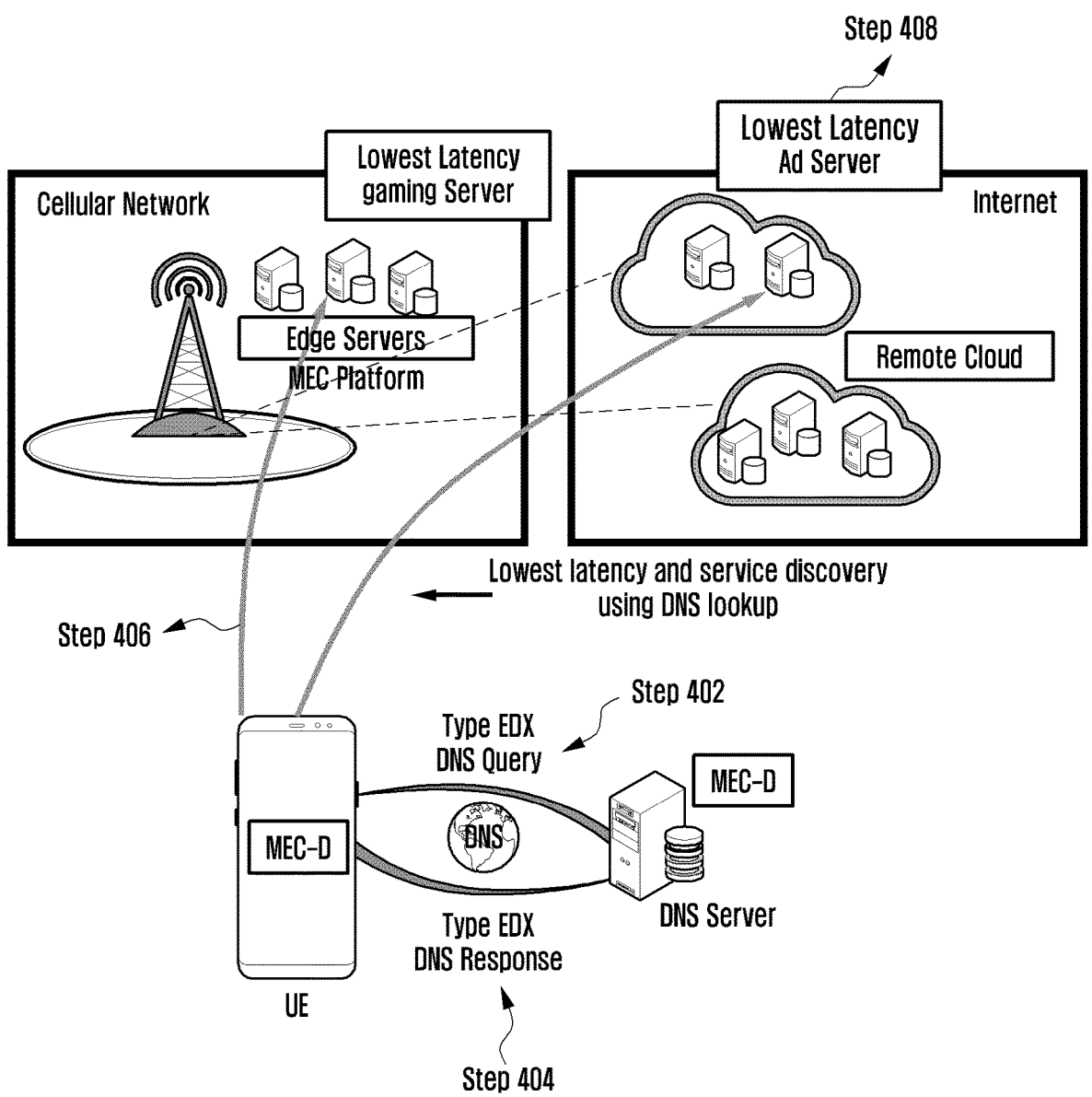
FIG. 9 illustrates another example implementation of method operations of FIG. 4, according to an embodiment of the disclosure.

Referring to FIG. 9, the UE avails lowest latency and service discovery using DNS lookup. In an implementation, a Lowest Latency Gaming Server is found as MEC server, while a Lowest Latency Ad Server is found as the remote cloud server based on the DNS look up.

Figure 10:
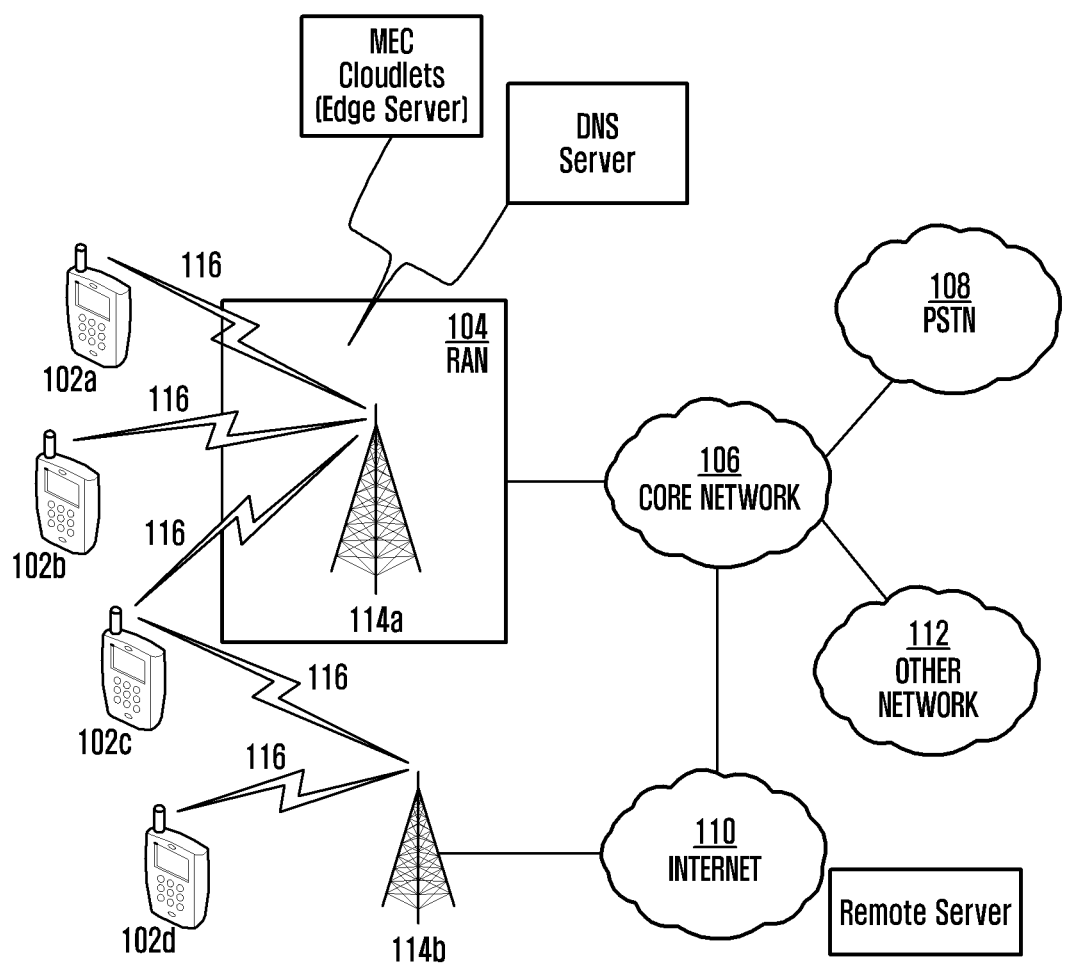
FIG. 10 illustrates a system diagram of an example communications system, in which one or more disclosed embodiments may be implemented, according to an embodiment of the disclosure.

FIG. 10 is a diagram of an example communications system in which one or more disclosed embodiments may be implemented according to an embodiment of the disclosure. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Referring to FIG. 10, the communications system 100 may include UEs or wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNodeB, a Home Node B, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT). More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A). In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b may be a wireless router, Home Node B, Home eNodeB, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 10, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the other networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers, transmitters, or receivers for communicating with different wireless networks over different wireless links. For example, the WTRU 102c shown in FIG. 10 may be configured to communicate with the base station 114a, which may employ a cellular-based radio technology, and with the base station 114b, which may employ an IEEE 802 radio technology.

At least by virtue of aforesaid features of the disclosure, Mobile Edge Computing (MEC) is configured to reduce latency, ensure highly efficient network operation and service delivery, and offer an improved user experience. In an example, the disclosure renders cloud-services within the close-proximity of mobile-subscribers and providing context-aware services. Moreover, the MEC-enabled apps are configured to compute the lowest latency MEC/Cloud server, and the service-discovery in User Equipment (UE) using MEC Layer is able to meet the strict-delay requirements of MEC.

In an example, the resource record MEC-D (MEC DNS) in the DNS server enhances the user experience by enabling UE to identify lowest latency MEC server and perform service discovery. The MEC-D provided DNS Resource Record (RR) enables UE to explore the network for all available services, to discover the edge-servers for low latency using the location information, and to advertise service types and to provide information required access it.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed:

1. A method performed by a terminal in a wireless communication system, the method comprising:
   transmitting, to a domain name server (DNS) server, a DNS query including a representative domain name in place of a plurality of domain names corresponding to a plurality of web-based services for an application of the terminal; and
   receiving, from the DNS server, a DNS response including server information on a plurality of servers corresponding to the plurality of web-based services for the application in response to the DNS query,
   wherein the server information includes an internet protocol (IP) address and at least one of a server name, a service type, a content type, or a server type for each of the plurality of servers.

2. The method of claim 1, comprising:
   evaluating each of the plurality of servers at least based on the plurality of web-based services and a distance of each of the plurality of servers with respect to the terminal; and
   selecting a nearby edge server and/or a remote server out of the plurality of servers for accessing one or more requested web-based services at least based on the evaluation.

3. The method of claim 1,
   wherein a resource record (RR) with respect to each of the plurality of servers is maintained at the DNS server, and
   wherein the RR includes information on, for each of the plurality of servers, at least one of:
   a server name,
   a flag indicating a type of server,
   a port number,
   a location including a latitude and a longitude of the location,
   an IP address,
   an IP version,
   a priority level,
   type of services rendered,
   type of content rendered, or
   a name of a supported protocol.

4. The method of claim 1, further comprising: identifying the application for the DNS query and a parameter related to at least one of:
   accessing content or information,
   discovering standard services defined by one or more of hypertext transfer protocol (HTTP), quick user datagram protocol (UDP) internet connections (QUIC), or file transfer protocol (FTP), or
   discovering non-standard services pertaining to one or more of advertisements, medical, or gaming services.

5. The method of claim 1, wherein the server information further includes a parameter, with respect to each of the plurality of servers, as at least one of:
   a current-load,
   a target server name,
   a port information, or
   a supported protocol.

6. The method of claim 2, wherein the evaluation comprises determining distance between:
   the terminal and the edge server, and
   the terminal and the remote server.

7. The method of claim 2, further comprising:
   identifying a list of services associated with edge servers of a mobile edge computing (MEC) platform and remote servers;
   classifying the plurality of servers configured to render the one or more requested web-based services based on a priority level and weightage associated with servers as received within the DNS response; and
   determining one or more nearest server out of edge servers and remote servers among the plurality of servers for the one or more requested web-based services based on the distance with respect to the terminal and the classification to thereby allow the selection of a low-latency server as a part of selection of the nearby edge server.

8. The method of claim 1, wherein in case of the terminal operating as a smartphone, the method further comprising:
   receiving mobile edge computing (MEC) enabled applications from a MEC platform during registering of the terminal with a mobile network operator; and
   communicating the DNS query during launching of the MEC enabled applications within the terminal and thereby selecting the nearest server for executing the MEC enabled application with low latency.

9. A terminal in a wireless communication system, the terminal comprising:
   a transceiver configured to transmit and receive a signal; and
   a hardware processor coupled with the transceiver and configured to:
   transmit, to a domain name server (DNS) server, a DNS query including a representative domain name in place of a plurality of domain names corresponding to a plurality of web-based services for an application of the terminal, and
   receive, from the DNS server, a DNS response including server information on a plurality of servers corresponding to the plurality of web-based services for the application in response to the DNS query,
   wherein the server information includes an internet protocol (IP) address and at least one of a server name, a service type, a content type, or a server type for each of the plurality of servers.

10. The terminal of claim 9, wherein the hardware processor is further configured to:
    evaluate each of the plurality of servers at least based on the plurality of web-based services and a distance of each of the plurality of servers with respect to the terminal; and
    select a nearby edge server and/or a remote server out of the plurality of servers for accessing one or more requested web-based services at least based on the evaluation.

11. The terminal of claim 9,
    wherein a resource record (RR) with respect to each of the plurality of servers is maintained at the DNS server, and
    wherein the RR includes information on, for each of the plurality of servers, at least one of:
    a server name,
    a flag indicating a type of server,
    a port number,
    a location including a latitude and a longitude of the location,
    an IP address,
    an IP version, a priority level,
type of services rendered,
type of content rendered, or
a name of a supported protocol.

12. The terminal of claim 9, wherein the server information further includes a parameter, for each of the plurality of servers, as at least one of:
   a current-load,
   a target server name,
   a supported protocol, or
   a port information.

13. The method of claim 1, wherein the server information further comprises at least one of:
   an indication indicating whether each of the plurality of servers is an edge server,
   a location of each of the plurality of servers, or
   a priority level of each of the plurality of servers.

14. The terminal of claim 9, wherein the server information further comprises at least one of:
   an indication indicating whether each of the plurality of servers is an edge server,
   a location of each of the plurality of servers, or
   a priority level of each of the plurality of servers.

15. The terminal of claim 9, wherein the hardware processor is configured to identify the application for the DNS query and a parameter related to at least one of:
   accessing content or information,
   discovering standard services defined by one or more of hypertext transfer protocol (HTTP), quick user datagram protocol (UDP) internet connections (QUIC), or file transfer protocol (FTP), or
   discovering non-standard services pertaining to one or more of advertisements, medical, or gaming services.

16. The terminal of claim 10, wherein the hardware processor is further configured to:
   identify a list of services associated with edge servers of a mobile edge computing (MEC) platform and remote servers,
   classify the plurality of servers configured to render the one or more requested web-based services based on a priority level and weightage associated with servers as received within the DNS response, and
   determine one or more nearest server out of edge servers and remote servers among the plurality of servers for the one or more requested web-based services based on the distance with respect to the terminal and the classification to thereby allow the selection of a low-latency server as a part of selection of the nearby edge server.

17. A method performed by a domain name server (DNS) server for discovering edge-servers and services in a mobile edge computing (MEC) platform based network, the method comprising:
   receiving, from a terminal, a DNS query including a representative domain name in place of a plurality of domain names corresponding to a plurality of web-based services for an application of the terminal; and
   transmitting, to the terminal, a DNS response including server information on a plurality of servers corresponding to the plurality of web-based services for the application in response to the DNS query,
   wherein the server information includes an internet protocol (IP) address and at least one of a server name, a service type, a content type, or a server type for each of the plurality of servers.

18. The method of claim 17, further comprising maintaining a resource record (RR) with respect to each of the plurality of servers,
   wherein the server information further includes information on, for each of the plurality of servers, at least one of:
   a current-load,
   a target server name,
   a port information,
   a supported protocol,
   an indication indicating whether each of the plurality of servers is an edge server,
   a location, or
   a priority level, and
   wherein the RR includes information on, for each of the plurality of servers, at least one of:
   a server name,
   a flag indicating a type of server,
   a port number,
   a location including a latitude and a longitude of the location,
   an IP address,
   an IP version,
   a priority level,
   type of services rendered,
   type of content rendered, or
   a name of a supported protocol.

19. A domain name server (DNS) server for discovering edge-servers and services in a mobile edge computing (MEC) platform based network, the DNS server comprising:
   a transceiver configured to transmit and receive a signal; and
   a hardware processor coupled with the transceiver and configured to:
   receive, from a terminal, a DNS query including a representative domain name in place of a plurality of domain names corresponding to a plurality of web-based services for an application of the terminal, and
   transmit, to the terminal, a DNS response including server information on a plurality of servers corresponding to the plurality of web-based services for the application in response to the DNS query,
   wherein the server information includes an internet protocol (IP) address and at least one of a server name, a service type, a content type, or a server type for each of the plurality of servers.

20. The DNS server of claim 19,
   wherein the server information further includes information on, for each of the plurality of servers, at least one of:
   a current-load,
   a target server name,
   a port information,
   a supported protocol,
   an indication indicating whether each of the plurality of servers is an edge server,
   a location, or
   a priority level,
   wherein the hardware processor is further configured to maintain a resource record (RR) with respect to each of the plurality of servers, and
   wherein the RR includes information on, for each of the plurality of servers, at least one of:
   a server name,
   a flag indicating a type of server,
   a port number, a location including a latitude and a longitude of the location,
an IP address,
an IP version,
a priority level,
type of services rendered,
type of content rendered, or
a name of a supported protocol.

\* \* \* \* \*